US008971450B2

(12) United States Patent
Oh et al.

(10) Patent No.: US 8,971,450 B2
(45) Date of Patent: Mar. 3, 2015

(54) TRANSMISSION DEVICE, RECEPTION DEVICE, TRANSMISSION METHOD AND RECEPTION METHOD FOR WIRELESS COMMUNICATION SYSTEM

(75) Inventors: Jung Yeol Oh, Daejeon-si (KR); Hyungsoo Lee, Daejeon-si (KR); Sang Sung Choi, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 388 days.

(21) Appl. No.: 13/297,862

(22) Filed: Nov. 16, 2011

(65) Prior Publication Data

US 2012/0177141 A1 Jul. 12, 2012

(30) Foreign Application Priority Data

Dec. 6, 2010 (KR) .................. 10-2010-0123413

(51) Int. Cl.
*H04L 27/06* (2006.01)
*H04L 27/04* (2006.01)
*H04L 27/20* (2006.01)

(52) U.S. Cl.
CPC .................. *H04L 27/2067* (2013.01)
USPC .......................... 375/308; 332/103

(58) Field of Classification Search
CPC . H04L 27/20; H04L 27/2014; H04L 27/2025; H04L 27/2067; H04L 27/2042; H04L 27/2075; H04L 27/38
USPC ........... 375/295, 298, 308, 329; 332/144, 103
See application file for complete search history.

(56) References Cited

U.S. PATENT DOCUMENTS

| 6,473,506 | B1 * | 10/2002 | Hook et al. | 379/279 |
|---|---|---|---|---|
| 2002/0097810 | A1 * | 7/2002 | Seki | 375/295 |
| 2004/0260985 | A1 * | 12/2004 | Krieger | 714/707 |
| 2010/0135431 | A1 * | 6/2010 | Kim et al. | 375/295 |
| 2011/0122969 | A1 * | 5/2011 | Oh et al. | 375/302 |
| 2011/0150124 | A1 * | 6/2011 | Kim et al. | 375/295 |
| 2013/0044841 | A1 * | 2/2013 | Mori et al. | 375/341 |

OTHER PUBLICATIONS

Jung-Yeol Oh , Jae-Hwan Kim , Hyung-Soo Lee and Jae-Young Kim, "A π/4-shifted Differential 8PSSK Modulation for High Data Rate WBAN System", ETRI, Korea, ICIS 2009, Nov. 2009.*
Jung-Yeol Oh, Jeong-Ki Kim, Hyung-Soo Lee, Sang-Sung Choi and Dong S. Ha, "Phase Rotation Shift Keying for Low Power and High Performance WBAN In-body systems", ETRI and Virginia Tech, Nov. 17-19, 2010, IEEE.*

(Continued)

*Primary Examiner* — Aristocratis Fotakis
(74) *Attorney, Agent, or Firm* — Staas & Halsey LLP (57) ABSTRACT

A transmission device for transmitting a signal in a wireless communication system is provided. The transmission device includes: a serial-to-parallel converter configured to convert an input serial bit stream into a parallel bit stream having three bits; and a phase rotation symbol mapper configured to map the parallel bit stream to a symbol having phase rotation characteristics, wherein when the parallel bit stream includes first to third bits, the phase rotation symbol mapper maps the second and third bits to a complex variable and sequentially maps a real number part and an imaginary number part of the complex variable to the front part and the rear part of a symbol in this order or to the rear part and the front part of the symbol in this order.

9 Claims, 11 Drawing Sheets

(56) References Cited

OTHER PUBLICATIONS

Jaehwan Kim, Jung Yeol Oh, Cheolhyo Lee, Hyung Soo Lee and Jae Young Kim, "PSSK Proposal for High-data-rate In-body WBA# PHY", IEEE-15-09-0179-03-0006, ETRI, Jul. 16, 2009.*

Jung-Yeol Oh, et al., "Phase Rotation Shift Keying for Low Power and High Performance WBAN In-body systems" 2010 IEEE, pp. 28-32.

Jung Yeol Oh, et al. International Conference on ICT Convergence 2010 under the title "Phase Rotation Shift Keying for Low Power and High Performance WBAN In-body systems" Nov. 18, 2010, 32pages.

* cited by examiner

TRANSMISSION DEVICE, RECEPTION DEVICE, TRANSMISSION METHOD AND RECEPTION METHOD FOR WIRELESS COMMUNICATION SYSTEM

CROSS-REFERENCE TO RELATED APPLICATIONS

This application claims the benefit of priority of Korean Patent Application No. 10-2010-0123413 filed on Dec. 6, 2010 which is incorporated by reference in its entirety herein.

BACKGROUND OF THE INVENTION

1. Field of the Invention

The present invention relates to wireless communication and, more particularly, to a transmission device, a reception device, a transmission method, and a reception method for a wireless communication system.

2. Description of the Related Art

Recently, demand for a low power consumption and high communication performance, as well as a data communication speed, in designing a wireless communication system is increasing. In particular, a communication system such as a wireless body area network (WBAN) for radio communication between an implant device implanted in a human body and a device outside the human body increasingly requires to have high sensitivity and consume less power.

The existing phase shift keying having excellent spectrum efficiency and reception performance is commonly used for a recent communication scheme. This method, however, is disadvantageous in which it can hardly obtain low power consumption due to a spectrum distortion generated from a nonlinear element and has a limitation in realizing a high speed data transmission between implant devices within a human body due to a limitation in a reception performance.

SUMMARY OF THE INVENTION

Therefore, an object of the present invention is to provide a transmission device and transmission method having high power efficiency and a reception device and reception method capable of providing high reception performance.

In order to accomplish the object, there is provided a transmission device including: a serial-to-parallel converter configured to convert an input serial bit stream into a parallel bit stream having three bits; and a phase rotation symbol mapper configured to map the parallel bit stream to a symbol having phase rotation characteristics, wherein when the parallel bit stream includes first to third bits, the phase rotation symbol mapper sequentially maps the second and third bits to a complex variable and sequentially maps a real number part and an imaginary number part of the complex variable to the front part and the rear part of a symbol in this order or to the rear part and the front part of the symbol in this order.

When the first bit is 0, the phase rotation symbol mapper may map the real number part of the complex variable to the front half of the symbol and the imaginary number part of the complex variable to the rear half part of the symbol.

When the first bit is 1, the phase rotation symbol mapper may map the real number part of the complex variable to the rear half of the symbol and the imaginary number part of the complex variable to the front half of the symbol.

The transmission device may further include: an upsampler configured to receive a symbol having the phase rotation characteristics and it performs upsampling from the received symbol; a transmission filter configured to filter the upsampled symbol; a digital-to-analog converter (DAC) configured to convert the filtered symbol into an analog signal; and a quadrature modulation unit configured to quadrature-modulate the converted analog signal.

The transmission filter may include a square root raised cosine filter.

To achieve the above object, there is also provided a transmission method of a transmission device in a wireless communication system, including: receiving an input bit stream; grouping the input bit stream into a parallel bit stream having three bits; and mapping the parallel bit stream into a symbol having phase rotation characteristics to generate a phase rotation symbol, wherein, in the generating of the phase rotation symbol, when the parallel bit stream includes first to third bits, the second and third bits are mapped to a complex variable, and a real number part and an imaginary number part of the complex variable are sequentially mapped to the front part and the rear part of a symbol in this order or to the rear part and the front part of the symbol in this order.

When the first bit is 0, the real number part of the complex variable may be mapped to the front half of the symbol and the imaginary number part of the complex variable may be mapped to the rear part of the symbol.

When the first bit is 1, the real number part of the complex variable may be mapped to the front half of the symbol and the imaginary number part of the complex variable may be mapped to the front half of the symbol.

The transmission method may further include: receiving the phase rotation symbol and upsampling the symbol; filtering the upsampled symbol; converting the filtered symbol into an analog signal; and quadrature-modulating the converted analog signal.

To achieve the above object, there is also provided a reception device including: a synchronization unit configured to sample first and second sample values at a time interval of ½ of a symbol period with respect to one symbol from a reception signal in which three bits are mapped to one symbol; an exchanging unit configured to exchange imaginary number parts of the first and second sample values; a comparison unit configured to compare absolute values of the first and second sample values whose imaginary number parts have been exchanged by the exchanging unit; and a signal detection unit configured to restore the three bits on the basis of the results of the comparison unit.

When the absolute value of the first sample value whose imaginary number part has been exchanged is greater than the absolute value of the second sample value whose imaginary number part has been exchanged, the signal detection unit may restore the first bit among the three bits into 0.

When the absolute value of the first sample value whose imaginary number part has been exchanged is smaller than the absolute value of the second sample value whose imaginary number part has been exchanged, the signal detection unit may restore the first bit among the three bits into 1.

The signal detection unit may restore the second and third bits among the three bits on the basis of a sample value having a greater absolute value among the first and second sample values whose imaginary number parts have been exchanged.

The reception device may further include: a quadrature demodulator configured to quadrature-demodulating a reception signal; an analog-to-digital converter (ADC) configured to convert the quadrature-demodulated reception signal into a digital signal; a matching filter configured to filter the converted digital signal and transmit the filtered signal to the synchronization unit; and a parallel-to-serial converter configured to receive a plurality of bits in parallel from the signal detection unit and convert the received parallel bits into serial bits.

To achieve the above object, there is also provided a reception method including: sampling first and second sample values at a time interval of ½ of a symbol period with respect to one symbol from a reception signal in which three bits are mapped to one symbol; exchanging imaginary number parts of the first and second sample values; comparing absolute values of the first and second sample values whose imaginary number parts have been exchanged; and restoring the three bits on the basis of the comparison results.

In the restoring of the three bits, when the absolute value of the first sample value whose imaginary number part has been exchanged is greater than the absolute value of the second sample value whose imaginary number part has been exchanged, the first bit among the three bits may be restored into 0.

In the restoring of the three bits, when the absolute value of the first sample value whose imaginary number part has been exchanged is smaller than the absolute value of the second sample value whose imaginary number part has been exchanged, the first bit among the three bits may be restored into 1.

In the restoring of the three bits, the second and third bits among the three bits may be restored on the basis of a sample value having a greater absolute value among the first and second sample values whose imaginary number parts have been exchanged.

According to exemplary embodiments of the present invention, a signal distortion due to non-linear characteristics generated from phase shift keying in a wireless communication system can be reduced. Compared with the existing quadrature phase shift keying (QPSK), 1.3 dB reception performance can be improved in terms of performance and power back-off characteristics of about 0.6 dB can be improved in terms of transmission power. The reception device having such advantages can be implemented without increasing complexity compared with the structure of the existing reception device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5(*a*) is a graph of a transmission output signal of quadrature phase shift keying (QPSK) by using a scatter diagram, and FIG. 5(*b*) is a graph of a transmission output signal according to PRK by using PRSK according to an exemplary embodiment of the present invention.

DETAILED DESCRIPTION OF THE INVENTION

Figure 1:
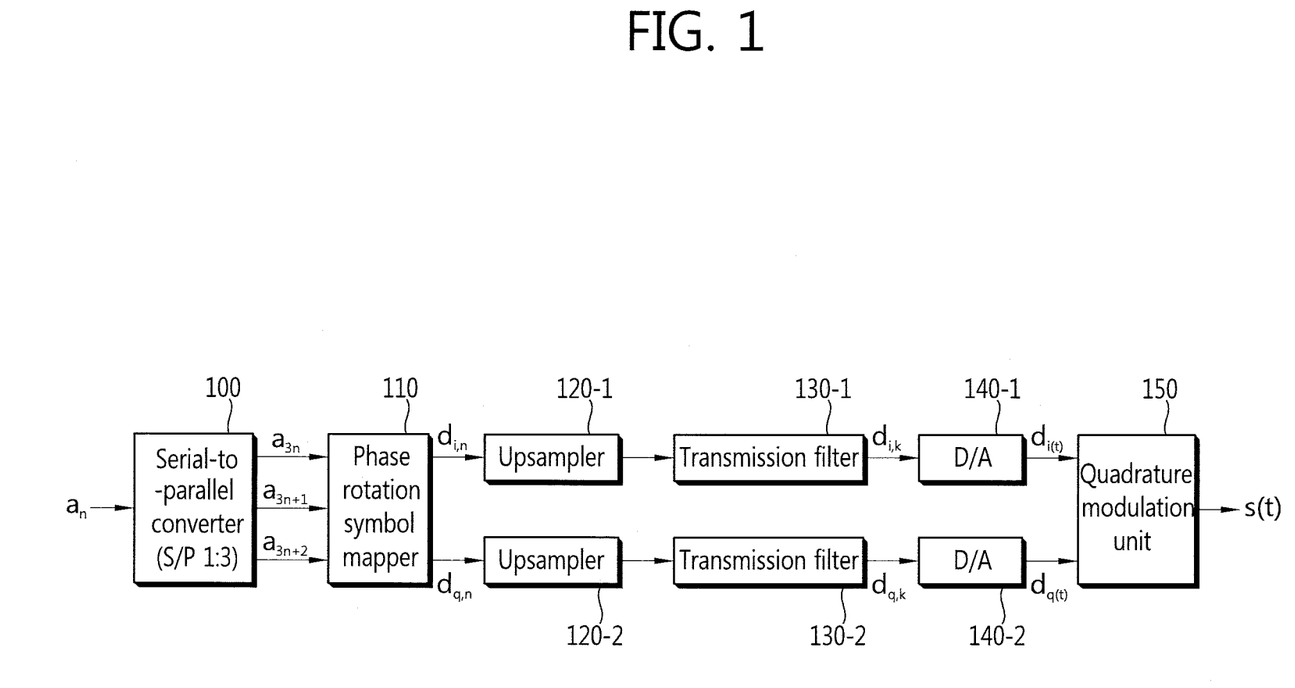
FIG. 1 is a schematic block diagram of a transmission device according to an exemplary embodiment of the present invention.

FIG. 1 is a schematic block diagram of a transmission device according to an exemplary embodiment of the present invention.

With reference to FIG. 1, the transmission device includes a serial-to-parallel converter 100, a phase rotation symbol mapper 110, upsamplers 120-1 and 120-2, transmission filters 130-1 and 130-2, digital-to-analog converters (D/As) 140-1 and 140-2, and a quadrature modulation unit 150.

The serial-to-parallel converter 100 performs parallel processing to map an input bit stream $\{a_n\}$ to a symbol. For example, the serial-to-parallel converter 100 may receive three serial bits, group them, and output them as parallel bits. Namely, when the input bit stream $\{a_n\}$ is "0101111000011111001100010", the input bit stream is grouped into three bits through the serial-to-parallel converter 100 and then output as {010}, {111}, {100}, . . . . The three grouped bits are mapped to one symbol. When the three grouped bits are mapped to one symbol, a time period Tb of the input bit stream and that of a symbol Ts are in the following relationship as represented by Equation 1 shown below:

$$T_S = 3T_b \qquad \text{[Equation 1]}$$

The phase rotation symbol mapper 110 receives the three grouped bits (which will be indicated as $\{a_{3n}, a_{3n+1}, a_{3n+2}\}$) and generates (or modulates) a symbol having phase rotation characteristics. A phase rotation symbol modulation method performed by the phase rotation symbol mapper will now be described.

Figure 2:
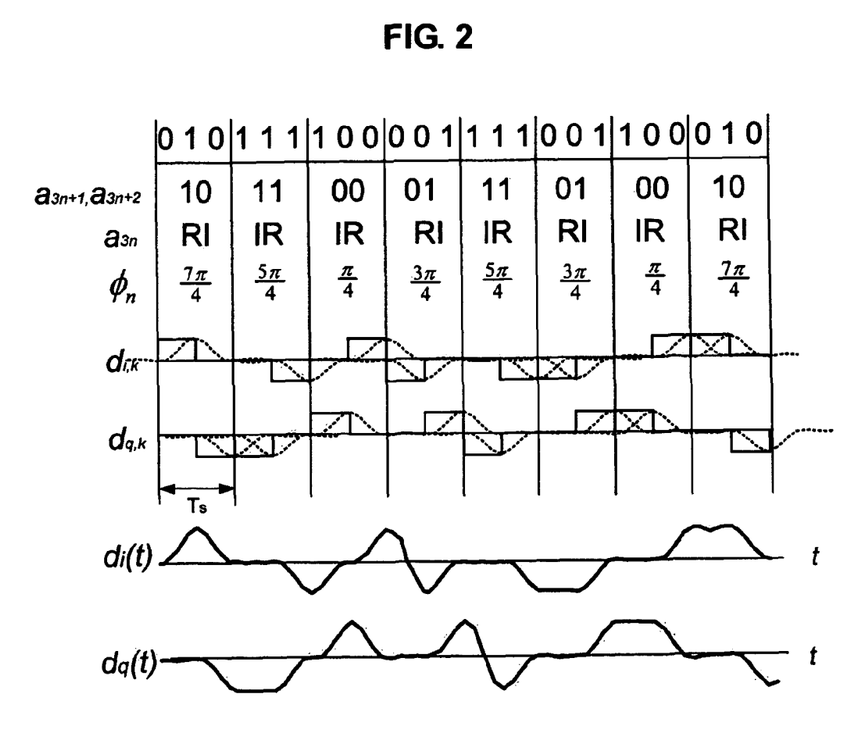
FIG. 2 is a view for explaining a phase rotation symbol modulation (generation) method performed in a phase rotation symbol mapper.

FIG. 2 is a view for explaining a phase rotation symbol modulation (generation) method performed in a phase rotation symbol mapper. Such a method may be called phase rotation shift keying (PRSK).

When the input bit stream input to the serial-to-parallel converter 100 is, for example, "0101111000011111001100010", as mentioned above, the input bit stream is grouped into three bits through the serial-to-parallel converter 100. In this case, the lower two bits among the grouped bits are mapped to a gray-coded complex number secondary plane having four phases so as to be generated as a complex variable $\{A_n\}$. Complex variables and phase values according to the pattern of the lower two bits may be set as shown in Table 1 below.

TABLE 1

| Pattern of $\{a_{3n+1}, a_{3n+2}\}$ | complex variable $\{A_n\}$ | Phase value $\{\phi\}$ |
|---|---|---|
| 00 | 1 + j | π/4 |
| 01 | −1 + j | 3π/4 |
| 10 | 1 − j | 7π/4 |
| 11 | −1 − j | 5π/4 |

The phase rotation symbol mapper 110 generates mutually differentiated symbols according to the first bit $\{a_{3n}\}$ among the three bits $\{a_{3n}, a_{3n+1}, a_{3n+2}\}$. Namely, the phase rotation symbol mapper 110 determines which of a real number part and an imaginary number part of the complex variable $\{A_n\}$ is to be disposed on a front part or a rear part in a time domain on the basis of the center (namely, $\{T_s/2\}$) of a time period of a symbol according to the first bit value of the three bits. For example, when the first bit value of the three bits is 0, the phase rotation symbol mapper 110 positions the real number part of the complex variable $\{A_n\}$ at the front part of the symbol based on $\{T_s/2\}$ of the symbol and the imaginary number part of the complex variable $\{A_n\}$ at the rear part of the symbol. Conversely, when the first bit value of the three bits is 1, the phase rotation symbol mapper 110 positions the imaginary number part of the complex variable $\{A_n\}$ at the front part of the symbol based on $\{T_s/2\}$ of the symbol and the real number part of the complex variable $\{A_n\}$ at the rear part of the symbol. The symbol generated through this process is called a phase rotation coded symbol. Hereinafter, the phase rotation coded symbol will be indicated as $\{d_n\}$.

With reference to FIG. 1, the phase rotation coded symbol $\{d_n\}$ is upsampled by the upsamplers 120-2 and 120-2.

The transmission filters 130-1 and 130-2 receive the upsampled signal and generates filtered signals $\{d_{i,k}, d_{q,k}\}$.

In the present exemplary embodiment of the present invention, because the orthogonality of the front part and the rear part in one symbol is used, a transmission filter and a roll-off factor γ which may be able to minimize intra-symbol interference must be selected. As the transmission filter 130, for example, a square root raised cosine (SRRC) filter may be used. As the roll-off factor γ for minimizing intra-symbol interference, 1 may be set. Also, time period characteristics of the transmission filter 130 must be performed as a half period $T_p$ of the symbol as represented by Equation 2 shown below, rather than the symbol period $T_s$.

$$T_p = T_s/2 \quad \text{[Equation 2]}$$

In this case, the transmission filters 130-1 and 130-2 may be represented by Equation 3 shown below:

$$\alpha(t) = \frac{4\gamma}{\pi\sqrt{T_p}} \frac{\cos[\pi(1+\gamma)t/T_p] + \frac{\sin[\pi(1-\gamma)t/T_p]}{4\gamma(t/T_p)}}{[1-(4\gamma t/T_p)^2]}$$

$$= \frac{4\sqrt{2}}{\pi\sqrt{T_s}} \frac{\cos[4\pi t/T_s]}{[1-(8t/T_s)^2]},$$

$$(\gamma = 1, T_p = T_s/2)$$

[Equation 3]

The signals $\{d_{i,k}, d_{q,k}\}$, which have been filtered through the transmission filters 130-1 and 130-2 overlap so as to be formed in the form of transmission signals as shown in FIG. 2.

The D/A 140 converts the digital signals into analog signals. Namely, the D/A 140 converts the $\{d_{1,k}, d_{q,k}\}$ having a digital signal form into analog signals having waveforms of $\{d_i(t), d_q(t)\}$ as shown in FIG. 2.

The quadrature modulation unit 150 quadrature-modulates the analog signals to generate a transmission signal. When the transmission signal generated by the quadrature modulation unit 150 is $S_n(t)$, $S_n(t)$ can be represented by Equation 4 shown below:

$$S_n(t) = Re\{[\{\bar{a}_{3n}\alpha(t)+a_{3n}\beta(t)\}\cdot Re\{\exp(j\phi_n)\}+j\{a_{3n}\alpha(t)+\bar{a}_{3n}\beta(t)\}\cdot Im\{\exp(j\phi_n)\}]\cdot \exp(j2\pi_c t)\}$$

[Equation 4]

In Equation 4, $Re\{c\}$ indicates a real number part of the complex variable c and $Im\{c\}$ indicates an imaginary number part of the complex variable c. $\{a_{3n}\}$ is the first bit among the three bits input to the phase rotation symbol mapper 110, $\{f_c\}$ is a radio carrier frequency, $\{\alpha(t)\}$ is a transmission filter defined in Equation 3, and $\{\beta(t)\}$ is defined as represented by Equation 5 shown below:

$$\beta(t) = \alpha(t-0.5T_s) \quad \text{[Equation 5]}$$

Figure 3:
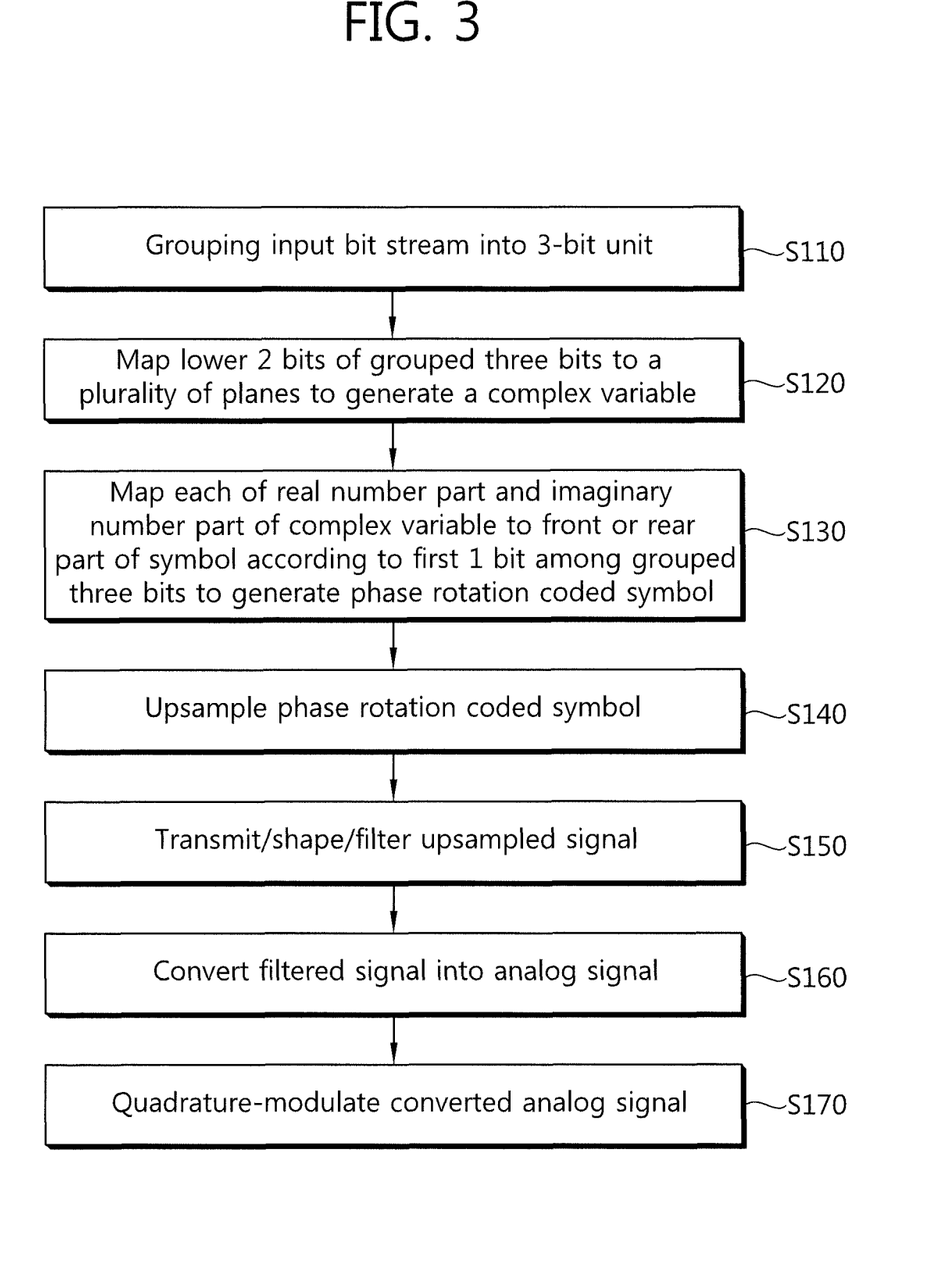
FIG. 3 is a flow chart illustrating the process of a transmission method in a wireless communication system according to an exemplary embodiment of the present invention.

FIG. 3 is a flow chart illustrating the process of a transmission method in a wireless communication system according to an exemplary embodiment of the present invention.

With reference to FIG. 3, the transmission device groups an input bit stream into 3-bit units (step S110). Two lower bits of the grouped three bits are mapped to a complex number plane to generate a complex variable (step S120). The real number part and imaginary number part of the complex variable are mapped to a front or rear part of a symbol according to the initial first bit of the grouped three bits to generate a phase rotation coded symbol (step S130). The phase rotation coded symbol is upsampled (step S140) and then transmission-shaping-filtered (step S150). The filtered signal is converted into an analog signal (step S160), and the converted analog signal is quadrature-modulated (step S170). The transmission device implementing this transmission method has been described above with reference to FIGS. 1 and 2.

Figure 4:
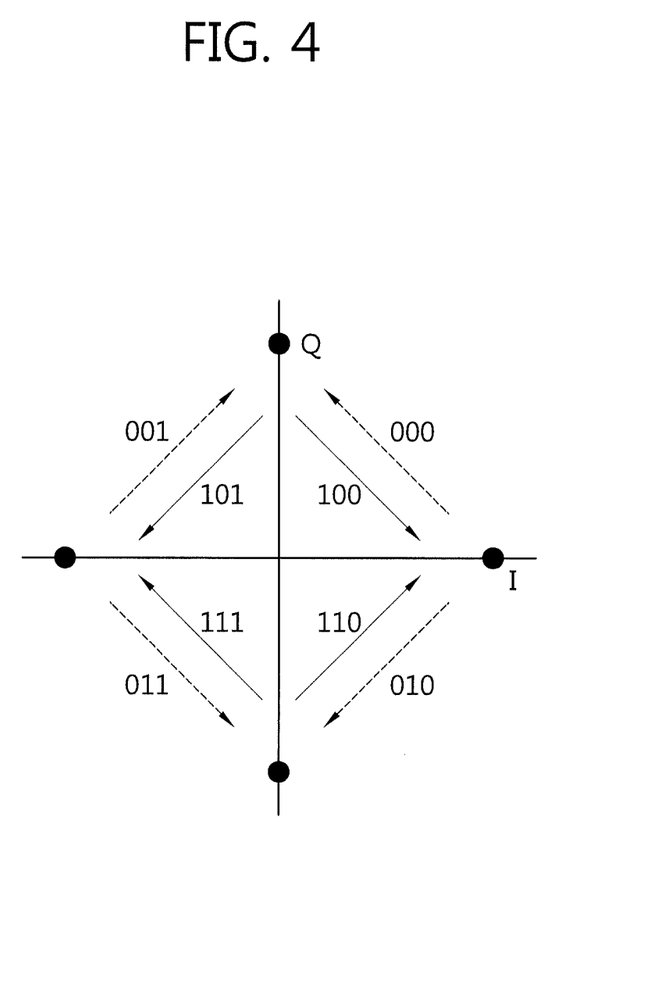
FIG. 4 is a view showing constellation points according to a transmission output signal of a transmission device according to phase rotation shift keying (PRSK).

FIG. 4 is a view showing constellation points according to a transmission output signal of a transmission device according to phase rotation shift keying (PRSK).

With reference to FIG. 4, the phase is rotated by (π/2) or (−π/2)} from a real number axis or an imaginary number axis at every symbol. For example, when the grouped three bits $\{a_{3n}, a_{3n+1}, a_{3n+2}\}$ are $\{010\}$, the phase is rotated by $\{(-π/2)\}$ from a positive direction of the real number axis (I axis) to a negative direction of the imaginary number axis (Q axis). When the grouped three bits $\{a_{3n}, a_{3n+1}, a_{3n+2}\}$ are $\{111\}$, the phase is rotated by $\{(-π/2)\}$ from the negative direction of the imaginary number axis to a negative direction of the real number axis.

Figure 5A:
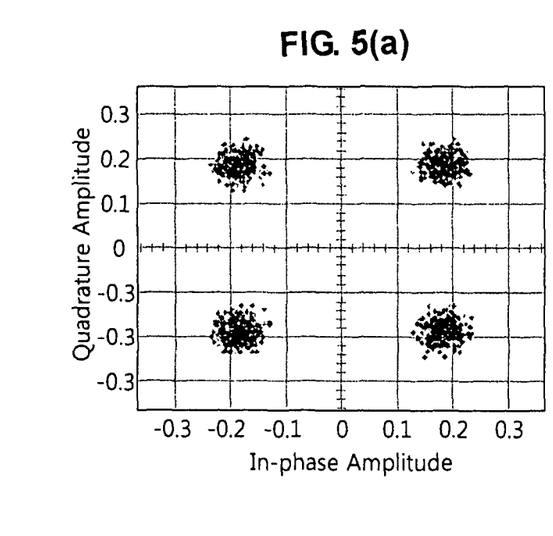
Figure 5B:
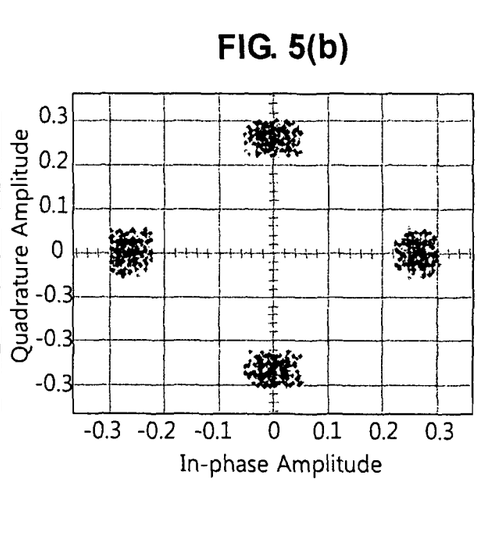

FIG. 5(*a*) is a graph of a transmission output signal of quadrature phase shift keying (QPSK) by using a scatter diagram, and FIG. 5(*b*) is a graph of a transmission output signal according to PRSK according to an exemplary embodiment of the present invention. With reference to FIG. 5(*a*), the four constellation points on an I-Q space can be checked. With reference to FIG. 5(*b*), over a transmission output signal of the PRSK, constellation points of symbols are generated in a space rotated by $\{π/4\}$ with respect to a transmission output signal of the QPSK.

Figure 6:
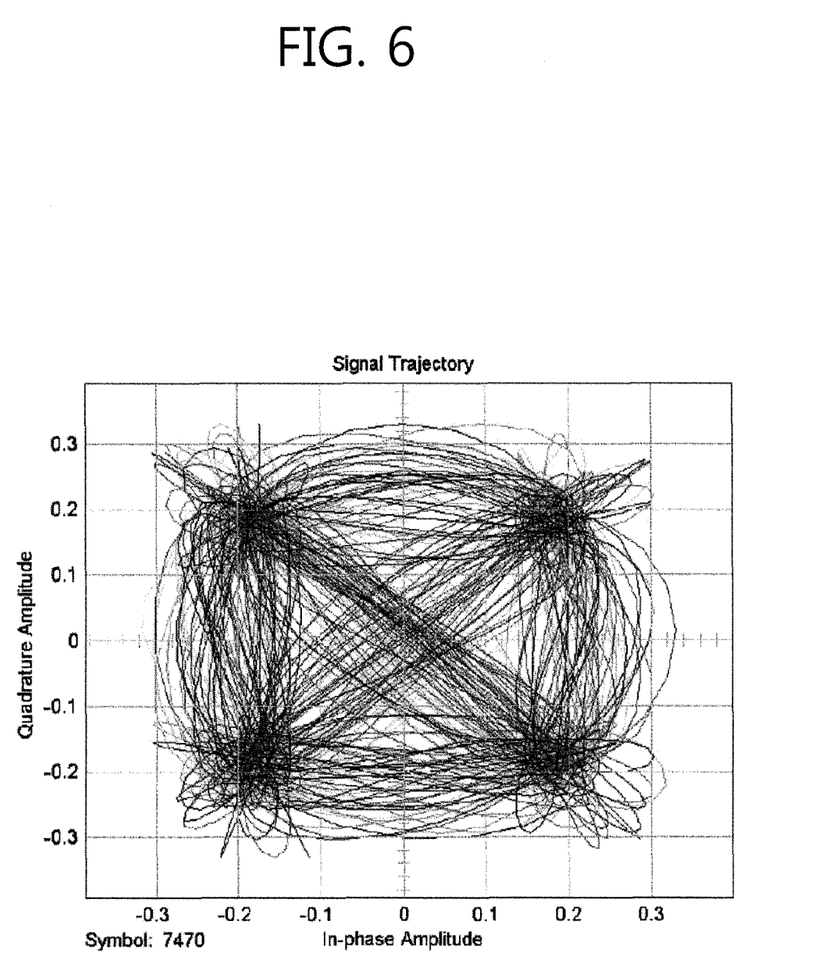
FIG. 6 is a graph of locus of transmission output signals of APSK through a signal trajectory diagram on a complex number plane.

FIG. 6 is a graph of locus of transmission output signals of QPSK through a signal trajectory diagram on a complex number plane.

With reference to FIG. 6, zero-crossing according to phase shifting of 180 degrees causes spectrum distortion by a non-linear element such as an amplifier in a radio frequency domain. The spectrum distortion results in a power loss through back-off of an operation area of the amplifier in order to compensate for the degradation of the non-linear characteristics.

Figure 7:
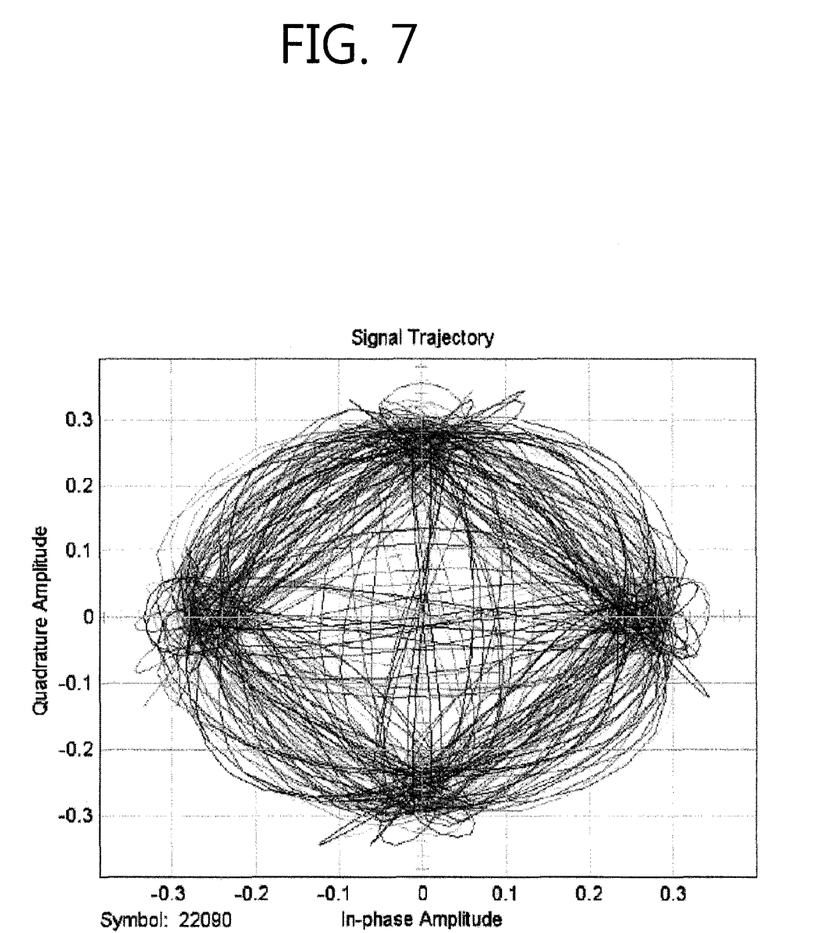
FIG. 7 is a graph of locus of transmission output signals of PRSK through a signal trajectory diagram on a complex number plane according to an exemplary embodiment of the present invention.

FIG. 7 is a graph of locus of transmission output signals of PRSK through a signal trajectory diagram on a complex number plane according to an exemplary embodiment of the present invention.

With reference to FIG. 7, as for the waveforms of the transmission output signal of PRSK according to the present exemplary embodiment, zero-crossing phase shifting is relatively reduced according to the phase rotation by 90 degrees at every symbol. Thus, the generation of spectrum distortion by the non-linear element like the analog transmission output signal of the transmission device according to the QPSK scheme can be reduced.

Figure 8:
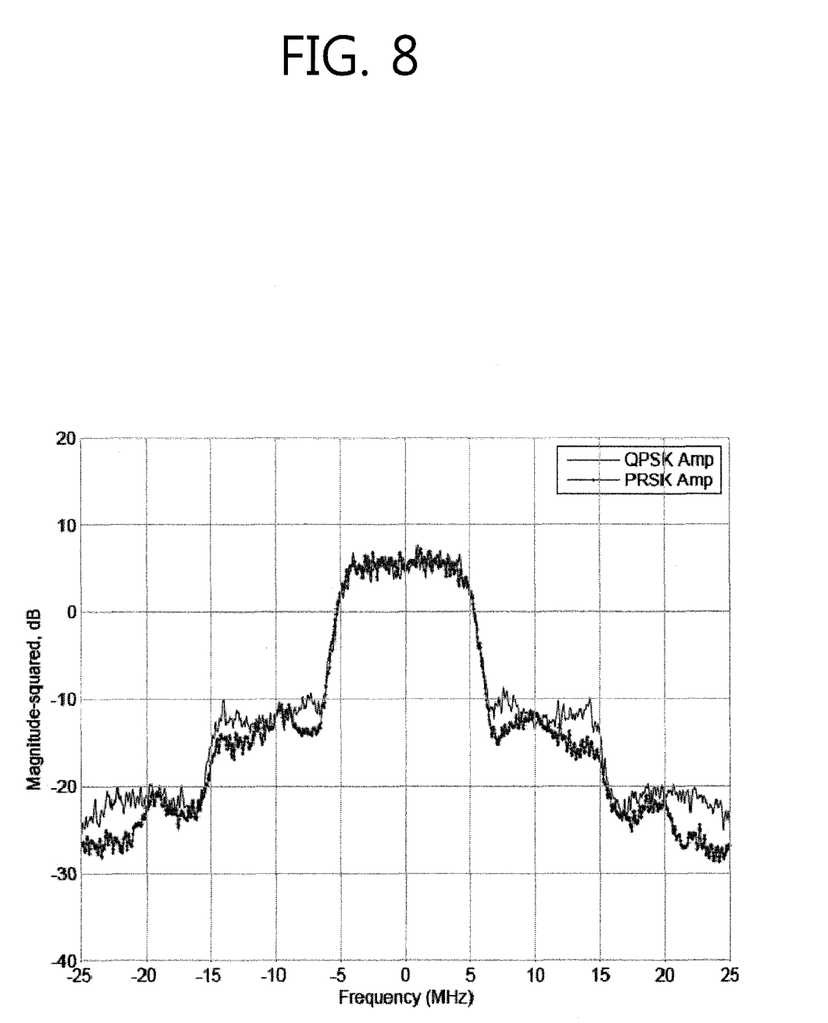
FIG. 8 is a graph showing the comparison of a frequency spectrum distortion phenomenon by a non-linear device through a spectrum diagram.

FIG. 8 is a graph showing the comparison of a frequency spectrum distortion phenomenon by a non-linear device through a spectrum diagram.

With reference to FIG. 8, it is noted that the PRSK scheme according to the present exemplary embodiment can considerably reduce power of an adjacent channel due to the non-linear characteristics compared with the existing QPSK scheme. This can be confirmed even through numerical values of PAPR (Peak-to-Average Power Ratio).

Table 2 below comparatively shows numerical values of the PAPR with respect to a transmission signal of the QPSK scheme and that of the PRSK scheme when a roll-off factor of the square root raised cosine filter is 1.

TABLE 2

| Modulation scheme | QPSK | PRSK |
| --- | --- | --- |
| PAPR (dB) | 3.48 | 2.88 |

With reference to Table 2, it is noted that the transmission signal of the PRSK scheme has a power efficiency of approximately 0.6 dB with respect to back-off compared with the transmission signal of the QPSK scheme.

A reception device and a reception method according to an exemplary embodiment of the present invention will now be described.

Figure 9:
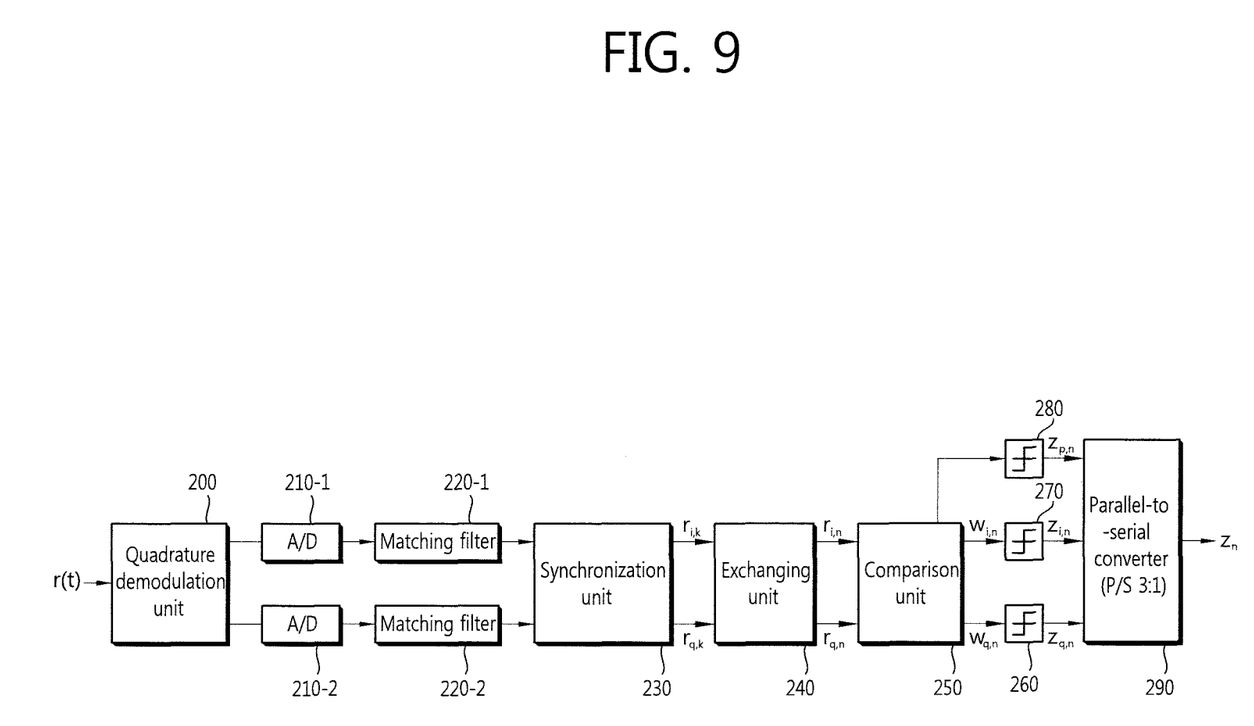
FIG. 9 is a schematic block diagram of a reception device of a PRSK scheme according to an exemplary embodiment of the present invention.

FIG. 9 is a schematic block diagram of a reception device of a PRSK scheme according to an exemplary embodiment of the present invention.

With reference to FIG. 9, the reception device includes a quadrature demodulation unit 200, analog-to-digital converters (A/Ds) 210-1 and 210-2, matching filters 220-1 and 220-2, a synchronization unit 230, an exchanging unit 240, a comparison unit 250, signal detection units 260, 270, and 280, and parallel-to-serial converter 290.

When a signal $\{s(t)\}$ transmitted by the transmission device passes through a radio channel, noise and a frequency error are added to the signal. A signal r(t) received by the reception device may be represented by Equation 6 shown below:

$$r(t) = e^{j\theta(t)}s(t-\tau) + n(t) \quad \text{[Equation 6]}$$

Here, $\{\theta(t)\}$ is a phase signal synthesized by inconsistency due to an error of a local oscillator, and $\{n(t)\}$ is complex Gaussian white noise having a power spectrum density $\{N_0/2\}$.

The quadrature demodulation unit 200 quadrature-demodulates the signal $\{r(t)\}$ received by the reception device. The quadrature demodulation unit 200 corresponds to the quadrature modulation unit 150 of the transmission device.

The A/Ds 210-1 and 210-2 convert the quadrature-demodulated signal into digital signals.

The matching filters 220-1 and 220-2 receive the converted digital signals and output maximum output values of the input signals. The matching filters 220-1 and 220-2 may use the same filter factor as that of the transmission filters 130-1 and 130-2 of the transmission device.

The synchronization unit 230 estimates and obtains timing synchronization and initial phase offset by using correlation characteristics of a preamble, and samples the same at a time interval of $\{T_s/2\}$. Namely, the synchronization unit 230 performs sampling twice in the signal symbol. In this case, a complex expression of the sampled and averaged reception signal is represented by Equation 7 shown below.

$$r_k = e^{j\{2\pi k \Delta f(T_s/2)\theta\}} s_k + n_k \quad \text{[Equation 7]}$$

Here, $\{\Delta f\}$ is a parameter due to the influence of a carrier frequency offset, and $\{\theta\}$ is an initial phase offset uniformly distributed from 0 to $2\pi$.

The exchanging unit 240 receives the reception signal $\{r_{i,k}, r_{q,k}\}$ sampled by the synchronization unit 230 and exchanges the sample values of the sampled reception signals. Namely, as shown in Equation 8 below, imaginary number parts of the first and second sample values within the single symbol are exchanged.

$$r_{2n} = Re\{r_{2k}\} + jIm\{r_{2k+1}\}$$

$$r_{2n+1} = Re\{r_{2k+1}\} + jIm\{r_{2k}\} \quad \text{[Equation 8]}$$

The comparison unit 250 obtains a signal size (namely, an absolute value), as represented by Equation 9 shown below, of the exchanged sample values as represented by Equation 8, compares the sizes of an even numbered signal ($r_{2n}$) and an odd numbered signal ($r_{2n+1}$), and outputs the results to the signal detection units 280, 270, and 260 which restore respective bits of the grouped three bits.

$$|r_{2n}| = \sqrt{r_{i,2n}^2 + r_{q,2n}^2}$$

$$|r_{2n+1}| = \sqrt{r_{i,2n+1}^2 + r_{q,2n+1}^2} \quad \text{[Equation 9]}$$

The signal detection unit 280 restores the first bit of the grouped three bits (the restored bit will be called $Z_{p,n}$). For example, the sizes of the two sample signals of the single symbol calculated as represented by Equation 9 are compared, and when the first sample value is greater, the first bit $\{z_{p,n}\}$ of the demodulated signal is determined as 0, and when the second sample value is greater, the first bit $\{z_{p,n}\}$ of the demodulated signal is determined as 1. This can be represented by Equation 10 shown below:

$$z_{p,n} = \begin{cases} 1, & |r_{2n}| \leq |r_{2n+1}| \\ 0, & |r_{2n}| > |r_{2n+1}| \end{cases} \quad \text{[Equation 10]}$$

With respect to the single symbol in the reception signal transmitted from the transmission device according to an exemplary embodiment of the present invention, when the imaginary number part of the value sampled from the front part of the symbol and that of the value sampled from the rear part of the symbol on the basis of $\{T_s/2\}$ are exchanged, both the real number part and the imaginary number part of the transmission signal can exist in the front or rear part of the symbol. Both the real number part and the imaginary number part of the transmission signal can exist in the front part of the symbol when the first bit of the group three bits is 0, and both the real number part and the imaginary number part of the transmission signal can exist in the rear part of the symbol when the first bit of the group three bits is 1. Thus, the signal detection unit 280 can restore the first bit of the grouped three bits by comparing the sizes of the sample values whose imaginary number parts have been exchanged as shown in Equation 10.

In order to restore the other remaining two bits of the grouped three bits, the comparison unit 250 outputs a symbol $\{w_n\}$ determined through a signal having a greater size (namely, the absolute value) as represented by Equation 11 shown below:

$$w_n = \begin{cases} r_{2n}, & |r_{2n}| > |r_{2n+1}| \\ r_{2n+1}, & |r_{2n}| \leq |r_{2n+1}| \end{cases} \quad \text{[Equation 11]}$$

In Equation 11, $r_{2n}$, $r_{2n+1}$ are signals after the imaginary number parts are exchanged by Equation 8.

The signal detection units 270 and 260 perform final decoding ($Z_{i,n}$, $Z_{q,n}$) on the other remaining two bits among the grouped three bits through a demodulation table as shown in Table 3 below.

TABLE 3

| Sign of ($w_{i,n}$, $w_{q,n}$) | Detection data ($z_{i,n}$, $z_{q,n}$) |
|---|---|
| +, + | 00 |
| +, − | 10 |
| −, + | 01 |
| −, − | 11 |

With reference to Table 3, the other remaining two bits can be restored through the signs of the in-phase component ($w_{i,n}$) and the quadrature-phase component ($w_{q,n}$) of the symbol $\{w_n\}$. Namely, Table 3 corresponds to Table 1 as described above.

The signal restored through the demodulation table is restored into an information signal $Z_n$ through the parallel-to-serial converter 290.

Figure 10:
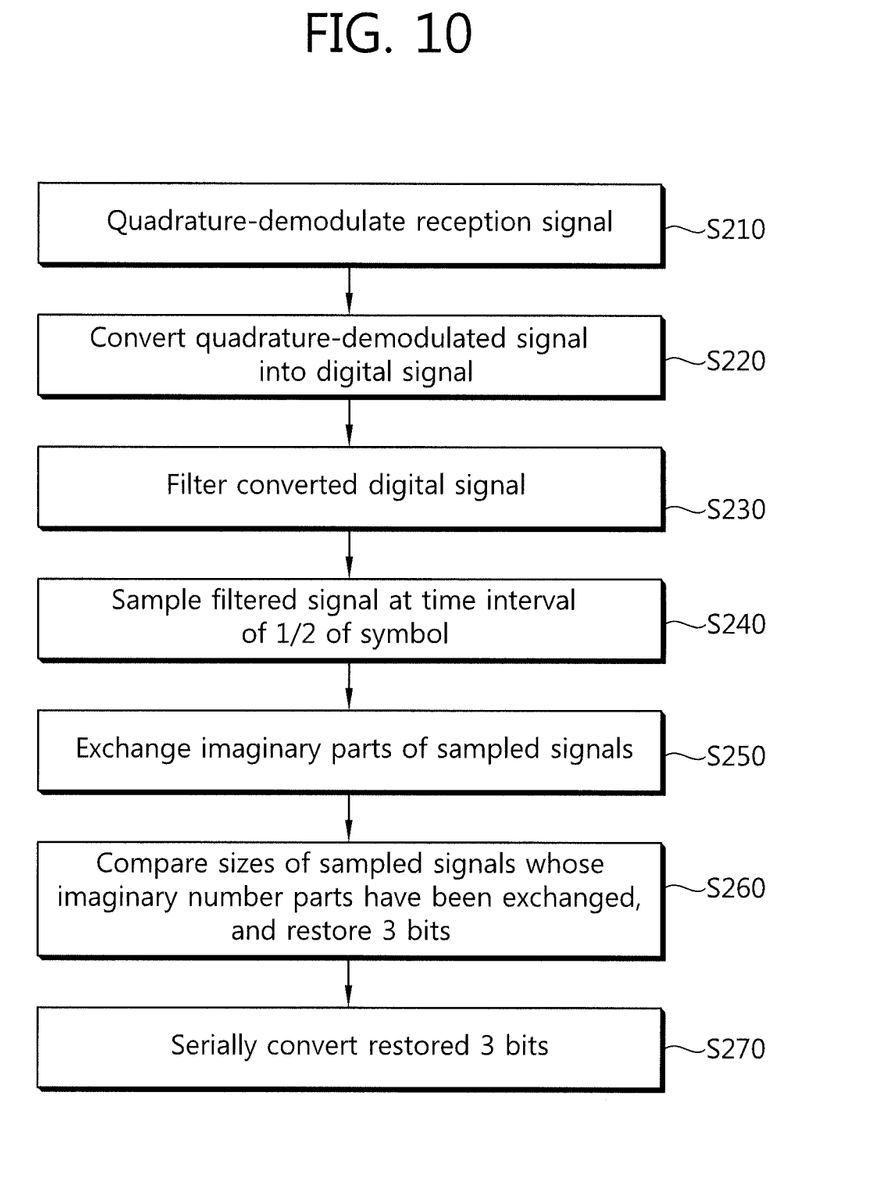
FIG. 10 is a flow chart illustrating the process of a reception method according to an exemplary embodiment of the present invention.

FIG. 10 is a flow chart illustrating the process of a reception method according to an exemplary embodiment of the present invention.

With reference to FIG. 10, the reception device quadrature-demodulates a reception signal (step S210), and converts the quadrature-demodulated signal into a digital signal (step S220). The digital signal is matching-filtered (step S230) and then sampled at an interval of a half of a symbol (step S240). Imaginary number parts of two sample values sampled for the one symbol are exchanged (step S250), and the sizes (namely, the absolute values) of the signals whose imaginary number parts have been exchanged are compared to restore the grouped three bits (step S260). The restored three bits are serially converted (step S270). The device implementing this method has been described in detail with reference to FIG. 9, and a repeated description thereof will be omitted.

Figure 11:
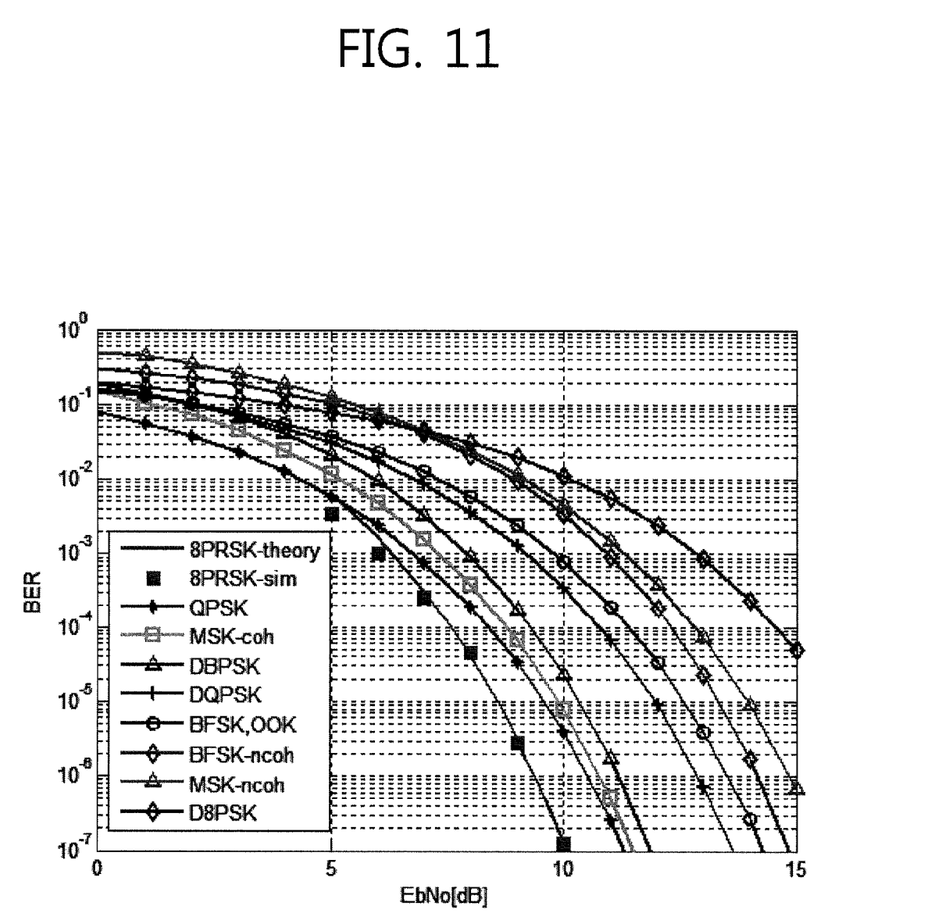
FIG. 11 is a graph showing the comparison between bit error rate (BER) performance according to white noise between the PRSK scheme according to an exemplary embodiment of the present invention and other schemes such as the existing QPSK, MSK and DQPSK.

FIG. 11 is a graph showing the comparison between bit error rate (BER) performance according to white noise between the PRSK scheme according to an exemplary embodiment of the present invention and other schemes such as the existing QPSK, MSK and DQPSK. The PRSK scheme has a gain of an approximately 1.3 dB over the QSPK scheme having the best performance among the existing schemes at BER $10^{-6}$.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A transmission device comprising:
   a serial-to-parallel converter configured to convert an input serial bit stream into a parallel bit stream having three bits; and
   a phase rotation symbol mapper configured to map the parallel bit stream to a symbol having phase rotation characteristics,
   wherein when the parallel bit stream includes a first bit, a second bit and a third bit, the phase rotation symbol mapper maps the second bit and the third bit to a complex variable and sequentially maps a real number part and an imaginary number part of the complex variable to the front part and the rear part of a symbol in this order or to the rear part and the front part of the symbol in this order according to the first bit.

2. The device of claim 1, wherein when the first bit is 0, the phase rotation symbol mapper maps the real number part of the complex variable to the front half of the symbol and the imaginary number part of the complex variable to the rear half of the symbol.

3. The device of claim 1, wherein when the first bit is 1, the phase rotation symbol mapper maps the real number part of the complex variable to the rear half of the symbol and the imaginary number part of the complex variable to the front half of the symbol.

4. The device of claim 1, further comprising:
   an upsampler configured to receive a symbol having the phase rotation characteristics and upsample the symbol;
   a transmission filter configured to filter the upsampled symbol;
   a digital-to-analog converter (DAC) configured to convert the filtered symbol into an analog signal; and
   a quadrature modulation unit configured to quadrature-modulate the converted analog signal.

5. The device of claim 4, wherein the transmission filter comprises a square root raised cosine filter.

6. A transmission method of a transmission device in a wireless communication system, the method comprising:
   receiving an input bit stream;
   grouping the input bit stream into a parallel bit stream having three bits; and
   mapping the parallel bit stream into a symbol having phase rotation characteristics to generate a phase rotation symbol,
   wherein, in the generating of the phase rotation symbol, when the parallel bit stream comprises a first bit, a second bit and a third bit, the second bit and third bit are mapped to a complex variable, and a real number part and an imaginary number part of the complex variable are sequentially mapped to the front part and the rear part of a symbol in this order or to the rear part and the front part of the symbol in this order according to the first bit.

7. The method of claim 6, wherein when the first bit is 0, the real number part of the complex variable is mapped to the front half of the symbol and the imaginary number part of the complex variable is mapped to the rear half of the symbol.

8. The method of claim 6, wherein when the first bit is 1, the real number part of the complex variable is mapped to the rear half of the symbol and the imaginary number part of the complex variable is mapped to the front half of the symbol.

9. The method of claim 6, further comprising:
receiving the phase rotation symbol and upsampling the phase rotation symbol;
filtering the upsampled symbol;
converting the filtered symbol into an analog signal; and
quadrature-modulating the converted analog signal.

\* \* \* \* \*